of the invention# UNITED STATES PATENT OFFICE.

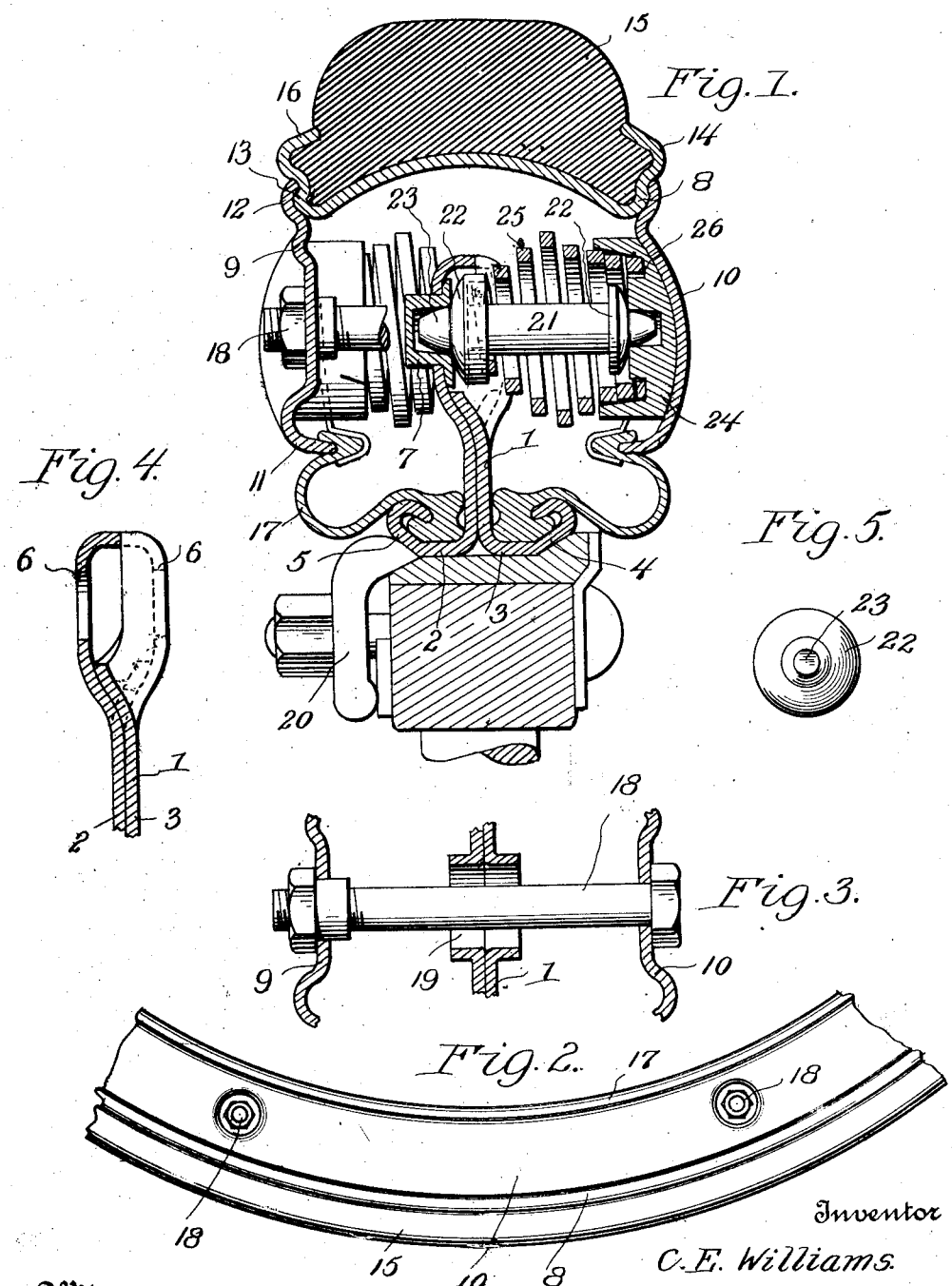

CHARLES E. WILLIAMS, OF PITTSBURGH, PENNSYLVANIA.

TIRE.

1,343,860. Specification of Letters Patent. Patented June 15, 1920.

Application filed March 8, 1918. Serial No. 221,227.

*To all whom it may concern:*

Be it known that I, CHARLES E. WILLIAMS, a citizen of the United States, residing at Pittsburgh, in the county of Allegheny and State of Pennsylvania, have invented new and useful Improvements in Tires, of which the following is a specification.

This invention relates to a tire and has for its primary object to provide a construction of this character capable of having the resiliency of a pneumatic tire without the use of air and in such a manner that the life of the tire will be materially increased.

An object of the invention is to so place the resilient elements that each element will perform services at all times irrespective of its particular position in the rotation of the wheel.

Another object of the invention is to provide a tire in which the resilient elements are inclosed so as not to be subjected to the elements.

Besides the above my invention is distinguished in the manner of constructing the tread member and supporting the tread element so that the parts may be quickly detached from each other but accomplishing a very rigid construction when the parts are assembled.

Another feature of my invention is the novel manner of supporting the springs and spindle so that each spring will be subject to a torsional strain as well as a compression and expansion action.

With these and other objects in view the invention will be better understood from the following detailed description taken in connection with the accompanying drawing wherein;

Figure 1 is a vertical sectional view through the tire.

Fig. 2 is a fragmentary side elevation of the tire.

Fig. 3 is a detailed cross-sectional view of a portion of the tire.

Fig. 4 is a detailed sectional view of a portion of the annulus.

Fig. 5 is an end elevation of the spindle.

Again referring to the drawing the numeral 1 designates an annulus shown in this particular instance as consisting of two rings of metal 2 and 3 bent to form clencher rims 4 and 5 and further to form bearings 6 stamped in opposite directions from the center of the annulus. At this point I wish to call attention to the fact that although the annulus is shown composed of two portions it may be constructed of a single length of material. Seated in each bearing is a bushing 7 for a purpose hereinafter described.

The tread member 8 of my invention consists of side plates or elements 9 and 10 each bowed transversely to have the required rigidity and further crimped at its ends as indicated at 11 and 12. The crimped edge 12 engages the crimped bead 13 on a channel ring 14 to which the tread element 15 is directly connected. The clencher rim 16 on the channel ring allows a new tread member to be substituted when the occasion demands. The crimped edge 11 is connected to the clencher rim of the annulus by a flexible cover 17 so as to exclude foreign matter from the interior of the tire.

As far as I have proceeded it will be seen that the elements may be quickly detached from each other and for the purpose of rigidly associating the elements with each other I provide bolts 18 of any desired number evenly distributed around the tire and passing through the side elements 9 and 10 and also through an enlarged opening 19 in the annulus so that the tread member may have the proper movement with relation to the annulus which is fixed in its movement with relation to the wheel by the clamping means 20.

For the purpose of giving the required amount of resiliency to the tire while at the same time accommodating excessive strain I provide the following structure. This structure consists of a plurality of spindles 21 distributed around the tire and each having a spherical head 22 adjacent each end which in this particular instance is curved on the proper arc of a circle to allow a rocking movement of the spindle upon the bushing and socket 24. The tapering ends 23 of the spindle engage suitably formed openings in the bushing 7 and socket 24 which is supported by the side elements with a result that the spindle is effectively held against complete disengagement from the annulus and side elements but still capable of a certain amount of rocking movement. One of the beads 22 is provided with a recess receiving one end of a double cone spiral spring 25, the other end of which being arranged in a tapering seat 26 in the socket 24.

From the foregoing description taken in connection with the accompanying drawing it should be apparent that I provide a tire of substantial construction and of the proper resiliency in which the parts are effectively held against distortion and capable of being readily disconnected from each other upon removing the bolts 18. A very important use of my invention is the fact that in the rocking movement of the spindle one side of the spring will be subjected to a contracting action while the other side will be subjected to an expanding action while torsional action of the spring will accommodate any tendency of the spindle to partly rotate.

Besides the above advantages my invention has the additional advantage that the tire may be manufactured at a relatively low cost as the different parts may be readily pressed or rolled from sheet metal with the exception of the bolts, spindles and sockets which may be machined.

It is to be understood that the structural embodiment of the invention as a whole and its various features as shown is merely illustrative and not restrictive, since I am well aware that many of the details of construction can be widely varied without departing from the spirit of the invention. I therefore do not desire to be limited in these particulars or in any others, except as set forth in the appended claims.

Having described my invention, what I claim is;

1. A tire comprising an annulus, a tread member including detachable side elements, spindles having a rocking connection with the side elements and said annulus, springs interposed between the side elements and annulus and bolts rigidly connecting the side elements together and having a loose connection with said annulus.

2. A tire comprising an annulus, bushings supported at spaced intervals by the annulus, a tread member including detachable side elements, sockets supported by the side elements, spindles having a rocking connection with the bushings and sockets and coil springs each having one end supported by the spindle and the other end by a socket.

3. A tire comprising an annulus, bushings supported at spaced intervals by the annulus, a tread member including detachable side elements, sockets supported by the side elements, spindles having a rocking connection with the bushings and sockets, coil springs each having one end supported by the spindle and the other end by a socket and bolts connecting the side elements and having a loose connection with the annulus.

In testimony whereof I affix my signature.

CHARLES E. WILLIAMS.